Aug. 30, 1932.                D. F. LINSLEY                1,875,051
                                 BRAKE
                           Filed May 21, 1930
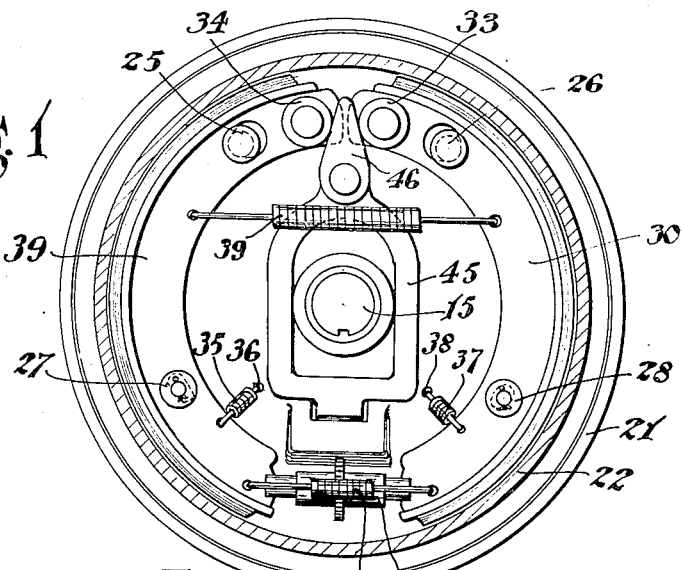
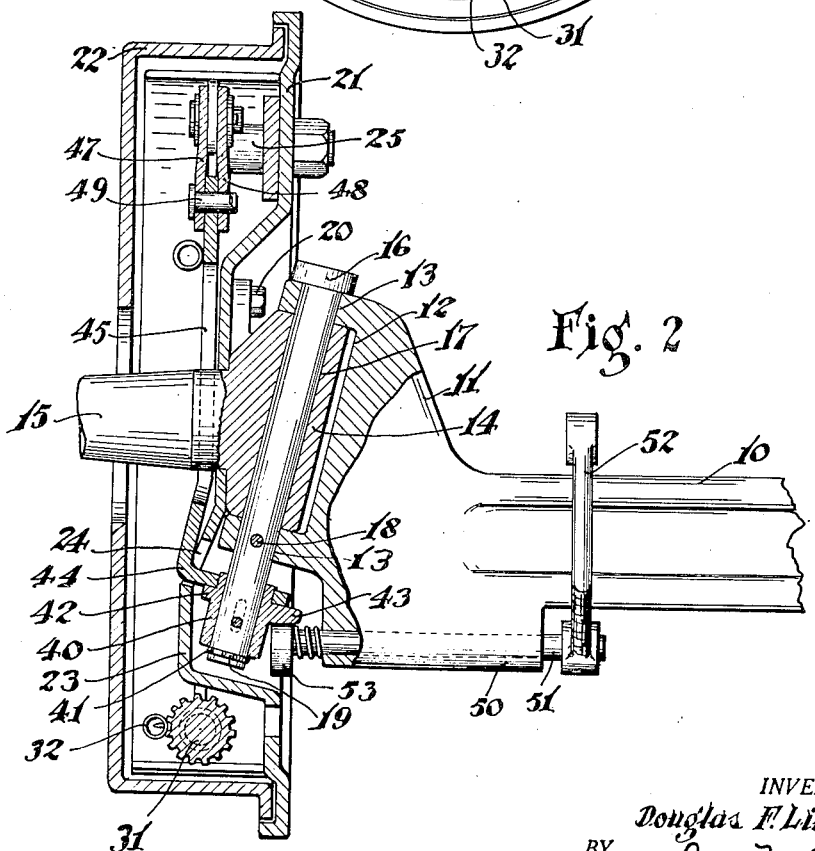
INVENTOR.
Douglas F. Linsley
BY
M. W. McConkey
ATTORNEY Patented Aug. 30, 1932

1,875,051

UNITED STATES PATENT OFFICE

DOUGLAS FOWLER LINSLEY, OF SOUND BEACH, CONNECTICUT, ASSIGNOR TO BENDIX BRAKE COMPANY, OF SOUTH BEND, INDIANA, A CORPORATION OF ILLINOIS

BRAKE

Application filed May 21, 1930. Serial No. 454,227.

This invention relates to brakes and more particularly to internal expanding brakes.

A major object of the invention is to improve the structure of an internal expanding brake, and more particularly the actuating means for the friction elements.

An important object of the invention is to provide an actuating member for the friction elements of an internal expanding brake remotely operated from the separable ends of the members.

Another object of the invention is to provide an operating means for the frictional elements of an internal expanding brake, wherein a thrust member movable diametrally of the brake is directed between the separable ends of the frictional elements.

A further object of the invention is to improve the structure of an internal expanding brake by the provision of an actuating member for the frictional elements of the brake having its operatable means concealed from view.

An important feature of the invention is a diametrally movable member adapted to engage the separable ends of the friction elements to spread them in engagement with the brake drum.

Another important feature of the invention is the housing of the operating means for the friction elements.

A further feature of the invention is the assembly of the actuating member for the frictional elements and the control means thereof with the pivot-pin steering head.

Other objects and features of the invention will appear from the following description, taken in connection with the drawing, which forms a part of this specification, and in which:—

Figure 1 is a side elevation of a brake embodying the invention, and

Figure 2 is a side elevation of a motor vehicle axle, having positioned thereon, a brake constructed in accordance with the invention, the brake being shown in section.

In the illustrated embodiment, 10 represents a front axle of a motor vehicle having formed thereon a steering head 11. This steering head comprises a steering fork 12 having registering openings 13. As shown, a knuckle 14 having a conventional spindle 15 is positioned in the fork 12 and a steering pivot-pin 16 extends through the registering openings 13 and a bore 17 in the knuckle, and the pivot-pin is secured in position as by a diametral pin 18. As shown, the pivot-pin is elongated and is provided on its lower end with a circumferential groove 19, the object of which will hereinafter appear.

Positioned on the knuckle 14 and suitably secured thereto as by bolts 20 is a backing plate 21 and associated therewith is a drum 22 adapted to be secured to a wheel, not shown. The wheel may be of any preferred type adaptable for rotation on the spindle 15. The backing plate 21 is swedged inwardly to provide a depression or recess 23 for the reception of the lower end of the steering pivot-pin with a substantial clearance, and below the steering fork the backing plate is slotted as indicated at 24, the object of which will hereinafter appear.

Positioned on the backing plate are anchors 25 and 26 and steady rests 27 and 28. A primary shoe 29 is positioned for movement on the anchor 25 and steady rest 27, and a secondary shoe 30 is positioned for movement on the anchor 26 and steady rest 28. The articulating ends of these shoes are connected as by a suitable adjustment device 31 and a coil spring 32 co-operating therewith to retain the shoes in adjusted position. As shown, the separable or shouldered ends of the shoes are provided with rollers 33 and 34 arranged thereon in spaced relation from the respective ends of the shoes.

The primary shoe is connected by a coil spring 35 to a fixed support 36 and a secondary shoe is connected by a coil spring 37 to a fixed support 38 and connecting the primary shoe to the secondary shoe is a coil spring 39. These springs serve to return the shoes to the off position, and to retain them when in the off position in proper spaced relation to the drum.

Positioned on the lower end of the steering pivot-pin is a sleeve 40, held against displacement by a ring 41 positioned in the circumferential groove 19. The sleeve 40 is positioned for axial movement on the steering pivot pin, and is secured against rotation by a pin in the shaft engaging a slot in the sleeve. The sleeve 40 has a circumferential flange 42, a portion of which is enlarged as indicated at 43. Positioned on the sleeve 40 and bearing upon the flange 42 is an arm 44. This arm projects through the slot 24 in the backing plate 21, and has formed integral therewith a yoke 45.

As shown, the yoke 45 straddles the spindle 15 and pivotally secured to the yoke is a wedge-shaped member 46 comprising two corresponding plates 47 and 48 pivoted on the respective sides of the yoke 45 as by a stud 49 passing through the plates and the yoke. These members engage the respective sides of the webs on the shoes, at their separable ends, and the inclined edges of the plates engage the respective rollers 33 and 34.

The axle 10 has formed thereon adjacent the steering head and immediately beneath the axle, a boss 50 in which is positioned for rotation a shaft 51 operated by a lever 52 adaptable for connection to a brake operating lever, not shown. The shaft 51 has on the free end thereof, a cam 53 engaging the enlarged portion 43 on the circumferential flange 42. Suitable means may be employed for retaining the cam in operative relation to the flange 42, and more particularly to the enlarged portion 43 thereon.

In operation, a pull is exerted on the lever 52 to rotate the shaft 51. The cam 53 carried by the shaft 51 moves the sleeve 39 axially on the steering pivot-pin to raise the yoke 45. This movement of the yoke forces the wedged shaped plates between the rollers 33 and 34 positioned on the webs of the respective shoes. This action effectively spreads the shoes apart for engagement with the radius of the drum. In this connection it is to be observed that, by reason of the particular structure of the wedged shaped member 46 the yoke is retained in proper position, and slight centrifugal movement of the shoes in either forward or reverse braking is provided for.

While a preferred embodiment of the invention has been described, it is to be understood that this is given merely as an example of the underlying principles of the invention and since this may be incorporated in other specifications of mechanical structures, I do not intend to be limited to that shown, except as such limits are clearly imposed by the appended claims.

Having thus described the various features of the invention, what I claim as new and desire to secure by Letters Patent, is:—

1. A brake comprising a support, a plurality of friction elements each having a rim and a web positioned for movement thereon, a yoke movable diametrally of the support, a member pivoted on the yoke engaging the respective sides of the webs, and adapted to spread the friction elements for engagement with the drum.

2. A brake comprising a spindle, a support thereon, a drum associated with the support, friction elements each having a rim and a web positioned for movement on the support, thrust rollers on the separable ends of the friction elements, a yoke positioned for diametral movement on the support having a portion straddling the spindle and a member pivotally connected to the yoke adapted to straddle the webs on the respective friction elements and to engage the rollers positioned thereon for spreading the friction elements in engagement with the drum.

3. In a motor vehicle brake, the combination with a steering knuckle supported by a pivot-pin, of a backing plate secured to the knuckle having a recess housing the lower end of the pivot-pin, a plurality of friction elements positioned for movement on the backing plate and means supported on the lower end of the pivot-pin for actuating the friction elements.

4. In a motor vehicle brake, the combination with a spindle and steering knuckle supported by a pivot pin, of a backing plate positioned on the steering knuckle having a recess receiving the lower end of the pivot-pin, a drum associated with the backing plate, a plurality of friction elements positioned for movement on the backing plate, thrust rollers on the friction elements adjacent the separable ends thereof, a member slidably positioned on the steering pivot-pin and adaptable for movement diametrally of the backing plate, a pivotal member carried thereby engaging the thrust rollers and means for slidably moving the member on the pivot-pin.

5. In a brake, the combination with a steering knuckle having a pivot-pin and a spindle, of a backing plate secured to the steering knuckle having a depression for the reception of the lower end of the pivot pin, a drum associated with the backing plate, a plurality of articulated friction elements positioned for movement on the backing plate, thrust rollers on the separable ends of the friction elements, a member slidably positioned on the lower end of the pivot pin and movable diametrally of the backing plate, a wedged shaped member positioned on the diametrally movable member adapted to engage the thrust rollers to spread the friction members in engagement with the drum.

6. In a brake, the combination with a steering head having a knuckle and a spindle, and a pivot pin swiveling the knuckle to the steering head, of a backing plate secured to the knuckle having a depression for the reception of the lower end of the pivot-pin, a drum associated with the backing plate, articulated friction elements positioned for movement on the backing plate, thrust receiving rollers on the separable ends of the friction elements, a yoke slidably positioned on the pivot-pin straddling the spindle and adapted to move in a vertical plane, a wedged shaped member pivoted on the yoke straddling the webs on the friction elements and engaging the thrust receiving rollers for spreading the friction elements for engagement with the drum.

7. In a brake, the combination with a steering head having a knuckle and a spindle and a pivot-pin swiveling the knuckle to the steering head, of a backing plate secured to the knuckle having a depression for the reception of the lower end of the steering pin, a yoke slidably positioned on the lower end of the steering pin, straddling the spindle and adapted to move in a vertical plane, a wedged shaped member pivotally connected to the yoke adapted to engage the respective sides of the web and friction elements and the thrust receiving rollers positioned thereon and means for sliding the yoke on the pivot-pin.

8. In a brake mechanism, the combination with a steering head, a knuckle supporting a spindle and a steering pivot pin swiveling the knuckle on the head, said pin extending downwardly beyond the fork of the steering head, of a backing plate secured on the knuckle having a depression for housing the extended end of the pivot pin, a drum associated with the backing plate, a plurality of articulated friction elements positioned for movement on the backing plate, thrust receiving rollers positioned on the webs of the friction elements adjacent their respective ends thereof, a yoke slidably positioned on the extended end of the pivot-pin, straddling the spindle and guided thereby and adapted for movement in a vertical plane, a wedged shaped member pivotally connected to the yoke engaging the respective sides of the webs on the friction elements and the thrust rollers on the webs to retain the yoke against displacement and cooperating with the thrust rollers to spread the shoes for engagement with the drum.

9. In a brake, the combination with a steering head, a knuckle formed with a spindle and a pivot-pin swiveling the knuckle to the steering head having its lower end extending downwardly beyond the fork of the steering head, of a backing plate secured to the knuckle having a depression housing the extended end of the pivot-pin, a drum associated with the backing plate, a plurality of articulated friction elements positioned for movement on the backing plate, thrust receiving rollers on the friction elements adjacent the separable ends thereof, a sleeve positioned for axial movement on the extended end of the pivot pin, means for limiting the movement of the sleeve, a yoke carried by the sleeve straddling the spindle and guided thereby in vertical movement, corresponding and oppositely arranged wedged shaped plates pivotally secured to the yoke and adapted to envelop the respective separable ends of the frictional elements and to engage the thrust rollers for spreading the shoes in engagement with the drum, and a cam supported by a steering head for moving the sleeve on the pivot-pin.

10. In a brake mechanism, the combination with a steering head, a knuckle supporting a spindle and a pivot-pin swiveling the knuckle to the steering head, a backing plate having a depression for housing one end of the steering pivot-pin, friction elements positioned on the backing plate and means slidably movable on the housed end of the pivot-pin for actuating the friction elements.

11. In a brake mechanism, the combination with an axle having a steering head, a knuckle supporting a spindle, a pivot-pin swiveling the knuckle to the steering head having its lower end extending beyond the fork of the steering head, of a backing plate secured to the knuckle having a depression for housing the extended end of the pivot-pin, a sleeve axially movable on the extended end of the steering pivot-pin, means securing the sleeve against rotating, a shaft rotatably supported by the axle, a cam on the shaft for moving the sleeve, a plurality of articulated friction elements movably positioned on the backing plate and means carried by the sleeve for actuating the friction elements.

In testimony whereof, I have hereunto signed my name.

DOUGLAS FOWLER LINSLEY.